United States Patent [19]
Samida et al.

[11] Patent Number: 6,165,298
[45] Date of Patent: Dec. 26, 2000

[54] PATTERNED ANVIL-ROLL

[75] Inventors: Jeffrey Joseph Samida, Appleton; Chris Lee Heikkinen, Menasha; Daniel Hoo, Appleton; David Andrae Justmann, Hortonville; David James Van Eperen, Appleton, all of Wis.

[73] Assignee: Kimberly-Clark Worldwide, Inc., Neenah, Wis.

[21] Appl. No.: 09/303,261

[22] Filed: Apr. 30, 1999

[51] Int. Cl.[7] ................................................ B32B 31/20
[52] U.S. Cl. ........................ 156/73.1; 156/552; 156/555; 156/580.2; 156/583.1
[58] Field of Search ............................... 156/73.1, 324, 156/552, 555, 580.1, 580.2, 583.1; 264/442, 443, 444; 425/174.2

[56] References Cited

U.S. PATENT DOCUMENTS

| | | | |
|---|---|---|---|
| 3,415,704 | 12/1968 | Bate | 156/515 |
| 4,461,662 | 7/1984 | Onishi | 156/73.4 |
| 4,798,603 | 1/1989 | Meyer et al. | 604/378 |
| 4,823,783 | 4/1989 | Willhite, Jr. et al. | 128/156 |
| 5,059,277 | 10/1991 | Willhite, Jr. et al. | 156/580.1 |
| 5,096,532 | 3/1992 | Neuwirth et al. | 156/580.1 |
| 5,104,728 | 4/1992 | Obermeyer et al. | 428/286 |
| 5,110,403 | 5/1992 | Ehlert | 156/580.1 |
| 5,176,668 | 1/1993 | Bernardin | 604/368 |
| 5,176,672 | 1/1993 | Bruemmer et al. | 604/385.1 |
| 5,192,606 | 3/1993 | Proxmire et al. | 428/284 |
| 5,401,342 | 3/1995 | Vincent et al. | 156/73.1 |
| 5,509,915 | 4/1996 | Hanson et al. | 604/378 |
| 5,540,808 | 7/1996 | Vincent et al. | 156/580.2 |
| 5,871,605 | 2/1999 | Bett | 156/73.1 |
| 5,989,370 | 11/1999 | Wannebo | 156/73.1 |
| 6,099,670 | 8/2000 | Louks et al. | 156/73.1 |

FOREIGN PATENT DOCUMENTS

| | | | |
|---|---|---|---|
| WO 98/28134 A1 | 7/1998 | WIPO | B32B 27/12 |

*Primary Examiner*—James Sells
*Attorney, Agent, or Firm*—Jeffrey B. Curtin

[57] ABSTRACT

An improved apparatus and method for effecting an operation on at least one continuously moving substrate web is disclosed. In particular, the apparatus includes a patterned anvil roll which includes a plurality of projections arranged in a predetermined pattern for effecting an operation on the web such as, for example, bonding, cutting, embossing, perforating and the like. The anvil roll includes recesses between the projections and resilient release material located in the recesses to improve the release of the substrate web from the anvil roll.

26 Claims, 3 Drawing Sheets

PATTERNED ANVIL-ROLL

BACKGROUND OF THE INVENTION

1. Field of the Invention

The present invention relates to a patterned anvil roll for pressing a continuously moving web to a second roll. The invention more particularly concerns an apparatus and method for ultrasonically bonding at least two continuously moving webs together using a rotary ultrasonic horn and a patterned anvil roll.

2. Description of the Related Art

Several different conventional methods have existed for pressing a continuously moving web between an anvil roll and another roll for the purpose of effecting a manipulation on the web such as, for example, bonding, cutting, embossing, perforating or chopping the web. For example, it has been well known to those skilled in the art to bond two continuously moving substrate webs together by constrictively passing them between a rotating bonding roll and a rotating anvil roll. The substrate webs have been bonded together by any means known to those skilled in the art such as thermal, ultrasonic or adhesive bonding. For example, the bonding roll has been heated to thermally bond the webs together as the webs constrictively traveled between the bonding roll and the anvil roll. Alternatively, the bonding roll has included a rotary ultrasonic horn which has been capable of transmitting ultrasonic energy to ultrasonically bond the two webs together as they constrictively traveled between the rotary ultrasonic horn and the anvil roll. Representative examples of rotary ultrasonic horns which have been used to bond at least two webs together are described in U.S. Pat No. 5,096,532 to Neuwirth et al. and U.S. Pat. No. 5,110,403 to Ehlert.

Typically, the bonding roll has had a smooth surface while the anvil roll has been configured with a bond pattern including a plurality of projections having bonding surfaces thereon and recesses therebetween to bond the webs together at the bonding surfaces in a predetermined pattern. Such a bonding roll has also been used to emboss, cut, perforate or chop the web or webs as well.

The consistency and quality of the bonds, cuts, embosses and the like and the resulting composite material can depend upon how well the material releases from the anvil and bonding rolls. For example, in many of the conventional patterned anvil rolls, the material momentarily sticks to the projections on the anvil roll which has undesirably resulted in tears in the material and inconsistency in the desired outcome such as inconsistent bonding, cutting, embossing, perforating, chopping and the like. This has been particularly true when the desired pattern includes very small dots or points or when one or more of the materials which are being passed between the rolls has included a coating thereon such as an adhesive. For example, when the pattern includes very small dots, the projections from the patterned anvil roll are much like pins which tend to snag and snare the materials being passed between the rolls. Moreover, when the materials include a coating such as adhesive thereon, the coating has often times filled the recesses between the projections on the anvil roll which has undesirably resulted in inconsistent bonds. Thus, conventional methods have not always been completely satisfactory.

The above-mentioned difficulties of maintaining the desired quality and consistency have been even more acute when ultrasonically bonding one or more continuously moving webs using a rotary ultrasonic horn. The rotary ultrasonic horn has inherent movement which may adversely affect the consistency and quality of the desired operation because it continuously vibrates at a given frequency and amplitude to efficiently bond, cut or emboss the web or webs. Moreover, in the case of coating buildup in the recesses between the projections on the anvil roll, such buildup has absorbed some of the ultrasonic energy generated by the rotary ultrasonic horn which has also undesirably resulted in reduced quality. Such acute difficulties have also been encountered when passing materials between an anvil roll and a rotary ultrasonic horn for other purposes including cutting, embossing, perforating, chopping and the like and combinations thereof. To improve the release of the material from the rolls, some conventional rolls have been coated with a nickel or chrome coating. However, such coatings have not been completely satisfactory. For example, such coatings have not always provided the desired snag free release of the material and reduced level of buildup in the recesses such as the undesirable buildup of adhesive.

SUMMARY OF THE INVENTION

In response to the discussed difficulties and problems encountered in the prior art, a new patterned anvil roll has been discovered.

In one aspect, the present invention provides an apparatus for effecting an operation on a continuously moving substrate web. The apparatus includes a first roll which is configured to rotate about a first axis and which includes a plurality of projections arranged in a predetermined pattern with recesses therebetween. The projections define a base and an outer peripheral land surface upon which the substrate web is configured to travel. The apparatus also includes a second roll which is configured to rotate about a second axis and which defines an outer peripheral surface which is configured to press the substrate web against the outer peripheral land surface of the projections on the first roll thereby effecting the operation on the substrate web. The first roll also includes a resilient release material at least partially filling the recesses between the projections on said first roll. In a particular aspect, the second roll is a rotary ultrasonic horn.

In another aspect, the present invention provides a method for effecting an operation on at least one continuously moving substrate web comprising the steps of:

a) supplying the continuously moving substrate web along a substrate path;

b) providing a first roll adjacent the substrate path which includes a plurality of projections arranged in a predetermined pattern with recesses therebetween and a resilient release material located in the recesses;

c) providing a second roll adjacent the substrate path wherein the second roll defines an outer peripheral surface which is configured to press the substrate web against the outer peripheral land surface of the projections on the first roll; and d) rotating one of the first roll and the second roll thereby pressing the substrate web against the outer peripheral land surface of the projections on the first roll to effect the operation on the substrate web.

The present invention, in its various aspects, can advantageously provide an improved patterned anvil roll which has reduced buildup and which readily releases the material after the desired operation on the material has been achieved. For example, the present invention can provide an apparatus and method for rotary bonding which, when compared to conventional devices, can more efficiently bond two continuously moving webs together while maintaining a substantially constant bond pattern between the webs. In particular, the patterned anvil roll of the present invention reduces the amount of tears in the material and exhibits reduced buildup between the projections on the anvil roll thereby improving the desired outcome such as improving bond quality and consistency. The patterned anvil roll of the present invention can be used for operations on one or more materials such as bonding, cutting, embossing, perforating, chopping and the like.

BRIEF DESCRIPTION OF THE DRAWINGS

The present invention will be more fully understood and further advantages will become apparent when reference is made to the following detailed description of the invention and the accompanying drawings wherein like numerals represent like elements. The drawings are merely representative and are not intended to limit the scope of the appended claims.

DETAILED DESCRIPTION OF THE INVENTION

The present invention provides a patterned anvil roll for effecting an operation on at least one continuously moving substrate web. In a particular embodiment, the anvil roll can be used directly in the manufacture of articles such as, for example, disposable diapers to bond, emboss, cut, perforate, chop or otherwise perform an operation on one or more materials in the article. In an alternative embodiment, the anvil roll can be used to provide a material which is subsequently used as a component in such articles.

The anvil roll of the present invention is particularly useful in the ultrasonic manipulation of two or more layers or webs of material which preferably are made, at least in part, from thermoplastic polymers. In particular, the patterned anvil roll of the present invention can be used to ultrasonically bond, cut, perforate, emboss or otherwise perform an operation on materials for use in a disposable diaper using a rotary ultrasonic horn. In addition, it should be readily understood that the patterned anvil roll of the present invention may be used in the manufacture of other types of articles, such as, for example, training pants, feminine care products, incontinence garments, hospital gowns and the like. All of such alternative configurations are contemplated as being within the scope of the present invention.

Figure 1:
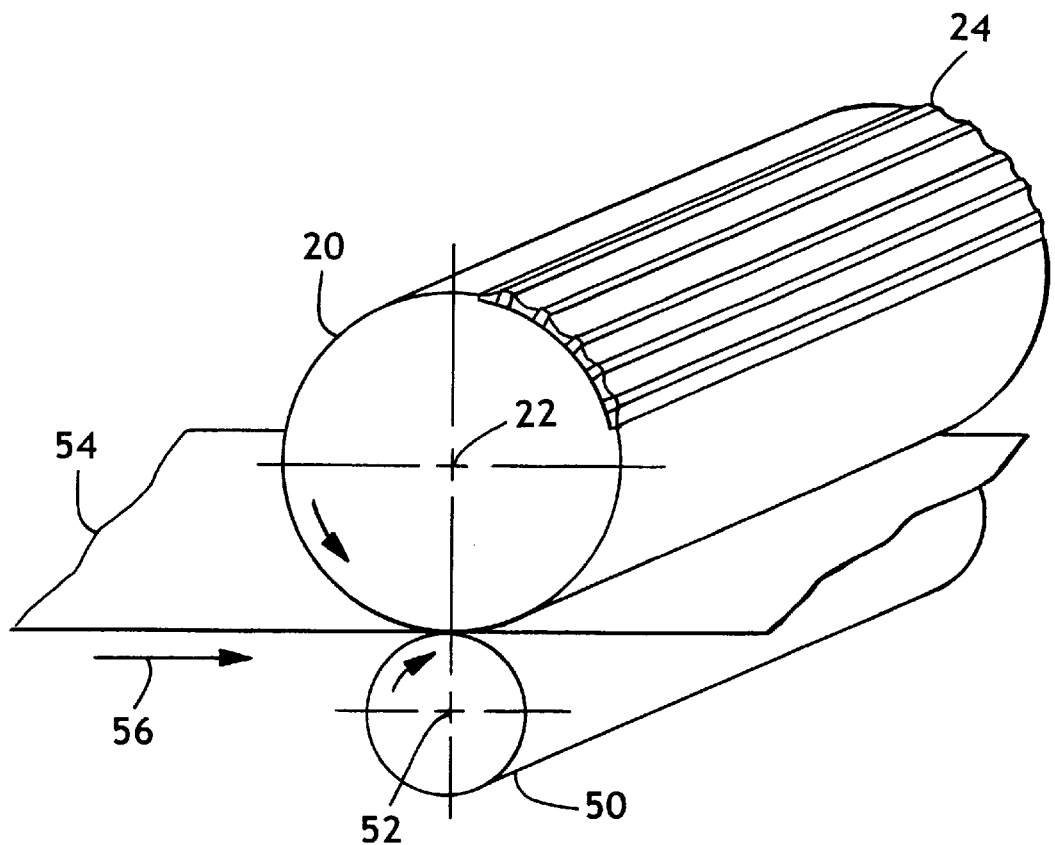
FIG. 1 representatively shows a perspective view of one example of a patterned anvil roll of the present invention having a plurality of projections thereon.
Figure 2:
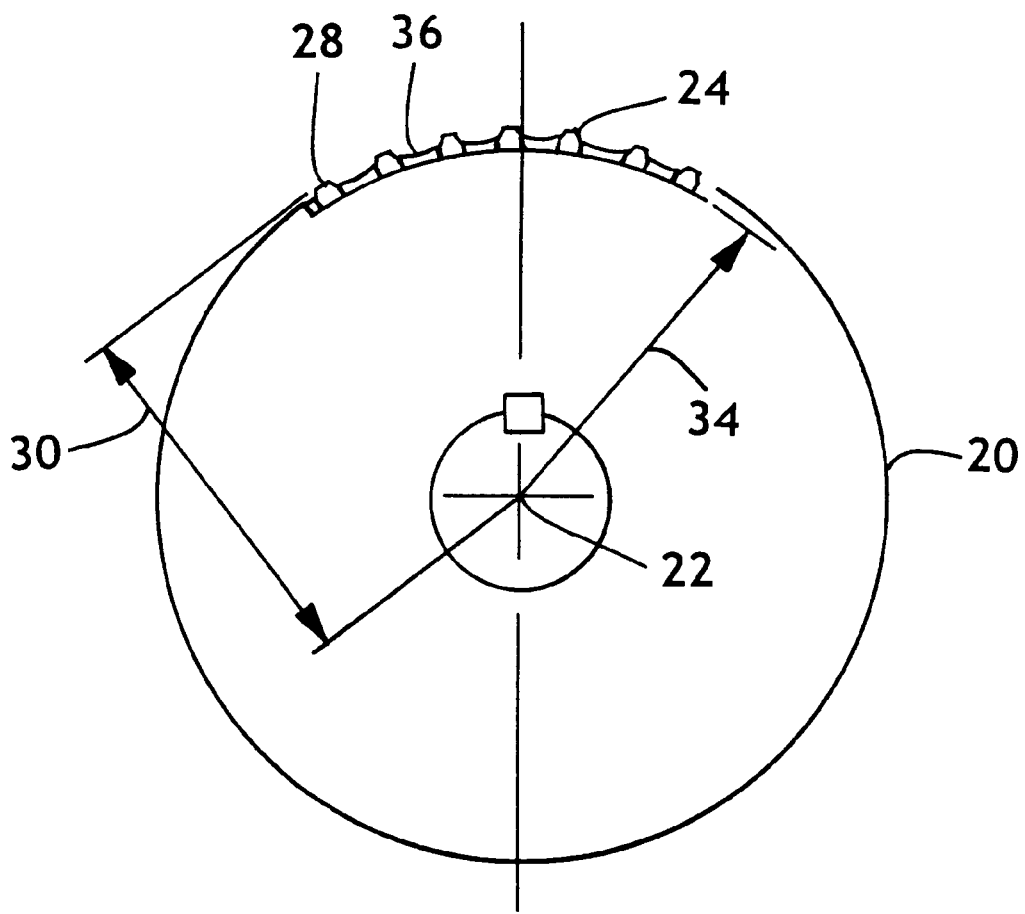
FIG. 2 representatively shows a sectional view of the anvil roll illustrated in FIG. 1 taken through a plane perpendicular to the axis of the anvil roll.
Figure 3:
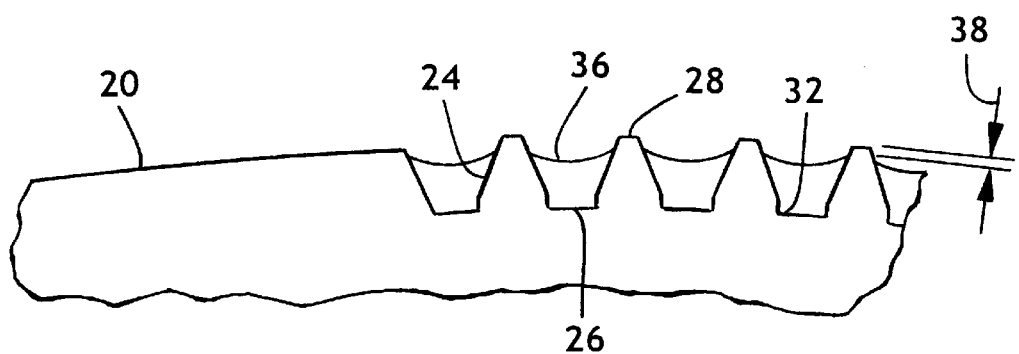
FIG. 3 representatively shows an expanded partial view of the projections illustrated on FIG. 2.

Referring to the Figures wherein like numerals represent like elements, a patterned anvil roll is representatively illustrated in FIGS. 1–3. The anvil roll, which is generally indicated as 20, defines an anvil axis 22 about which the anvil roll 20 rotates. The anvil roll 20 also includes a plurality of projections 24 which define a base 26 (FIG. 3) and an outer peripheral anvil land 28 upon which the desired manipulation of the web 54 or webs occurs. In particular, the anvil lands 28 of the projections 24 are configured to operate in conjunction with a second roll 50 rotating about a second axis 52 such as, for example, a rotary ultrasonic horn, to bond, cut, perforate, emboss or otherwise effect an operation on at least one continuously moving web 54.

As representatively illustrated in FIGS. 1–3, the anvil roll 20 is configured to rotate about the anvil axis 22. To allow rotation, the anvil roll 20 can be connected to a shaft by suitable means such as by using welds, bolts, screws, a matching key and keyway and the like. The anvil roll 20 and shaft may then be rotatably mounted and connected to a frame support by suitable means such as, for example, conventional bearings. Typically, the anvil roll 20 is driven by the second roll 50 which is driven by means known to those skilled in the art such as, for example, an electric motor. The anvil roll 20 and second roll 50 can be made from any material that is capable of withstanding the force exerted during the desired operation on the web or webs. Desirably, the anvil roll 20 is made from steel.

The substrate web 54 or webs which are passed between the anvil roll 20 of the present invention and the second roll 50 may be provided by any materials known to those skilled in the art which are compatible with the desired operation. For example, the substrate web may include a nonwoven material such as a spunbond, meltblown, spun laced or carded polymeric material, a film material such as a polyolefin or polyurethane film, a foam material or combinations thereof. For the purposes of the present description, the term "nonwoven web" shall mean a web of material which is formed without the aid of a textile weaving or knitting process.

The substrate web 54 or webs may also be elastic or nonelastic such as a film or layer of natural rubber, synthetic rubber or thermoplastic elastomeric polymers. As used herein, the terms "elastomeric" or "elastic" refer to any material that, upon application of a biasing force, is capable of being elongated or stretched in a specified direction from at least about 20 percent to about 400 percent and which will recover to within at least from about 5 to about 35 percent of its original length after being elongated or stretched. In a specific aspect, at least one of the substrate webs is formed from an elastomeric material such as a stretch-bonded-laminate (SBL) material, a neck-bonded-laminate (NBL) material, an elastomeric film, an elastomeric foam material, an elastic strand or the like as are well known to those skilled in the art.

In a particular embodiment, the substrate web 54 comprises a composite of a nonwoven material having material strands adhesively bonded thereto. In such a configuration, the projections 24 on the anvil roll 20 are arranged in a predetermined pattern and are configured to contact the substrate web 54 to divide the strands at selected spaced apart locations to operatively generate a plurality of strand segments. Where the material strands are composed of an elastomeric material, the segmenting of the strands can operatively disable the elastomeric properties of the strands at the locations in which the strands have been segmented. As a result, the elastomeric strands, can be configured to provide relatively less retraction at the regions within which the strands have been operatively segmented. Such a composite can be used for elastic components on an absorbent article such as leg elastics or containment flaps as are well known to those skilled in the art.

In the case of bonding two substrate webs together, it should be apparent that adequate bonding can be achieved by a variety of mechanisms. For example, the bond can result from the partial or complete melting of the substrate webs. The bond can also result from the partial or complete melting of only one of the substrate webs with the melted material flowing onto the adjacent substrate web which in turn results in the mechanical interlocking of the substrate webs to each other. The substrate webs may be melted and bonded by any means known to those skilled in the art, such as, for example, thermally or ultrasonically.

For example, two continuously moving substrate webs may be ultrasonically bonded together between the anvil roll 20 and the second roll 50 such as a rotary ultrasonic horn. In such a configuration, the anvil roll 20 is configured to rotate about the anvil axis 22 to press the substrate webs against the bonding surface of the rotary ultrasonic horn 50 thereby bonding the substrate webs together. The webs may otherwise be passed between the anvil roll 20 and a heated bonding roll 50 to thermally bond the substrate webs together. Alternatively, the two substrate webs may be adhesively bonded together by applying an adhesive to at least one of the substrate webs before the webs are pressed together between the anvil roll 20 and second roll 50.

The mechanisms described above as being suitable for bonding can also be used to cut, perforate, emboss or otherwise perform an operation on one or more continuously moving webs of material. For example, the pressure between the anvil roll and second roll or the time the web or webs are in the nip between the rolls may be increased to create a cut or series of perforations in the web or webs.

Examples of rotary ultrasonic horns which can be used as the second roll 50 with the anvil roll 20 of the present invention are described in U.S. Pat. No. 5,096,532 to Neuwirth et al. and U.S. Pat. No. 5,110,403 to Ehlert, which are herein incorporated by reference. In general, the rotary ultrasonic horn may be made from any metal having suitable acoustical and mechanical properties. Suitable metals include aluminum, monel, titanium and some alloy steels. In general, variables such as the diameter, mass, width, thickness and configuration of the rotary ultrasonic horn are not critical. However, the variables do determine the particular frequency and amplitude at which the rotary ultrasonic horn resonates and vibrates which are quite important depending on the desired operation on the web or webs.

In a particular embodiment, a suitable rotary ultrasonic horn is intended to be excited at a frequency of from about 18 to about 60 kHz. The horn has a diameter of from about 4 to about 20 centimeters and a width at the bonding surface of from about 0.6 to about 13 centimeters. The thickness of the horn at the rotational axis is from about 0.06 to about 15 centimeters. The horn has a mass in the range of from about 0.06 to about 30 kilograms. The diameter, width and thickness of the horn are selected such that the horn, upon being excited by ultrasonic energy at a desired frequency, is adapted to resonate such that the excited end moves substantially in phase with the movement of the source of excitation and the opposed end and bonding surface move substantially out of phase with the excited end. Thus, upon subjecting the horn to ultrasonic excitation, the excited end moves in a direction towards the interior of the horn while the opposing end and the bonding surface move in the opposite direction which is also towards the interior of the horn. As such, the movements of the ends of the horn relative to each other are said to be out of phase.

When using such a rotary ultrasonic horn, a drive mechanism is necessary to rotate and ultrasonically excite the rotary ultrasonic horn. Any mechanism which provides the desired rotation and excitation can be used in the present invention. Such mechanisms are well known to those skilled in the art. For example, a suitable drive mechanism is commercially available from Dukane Corporation located in St. Charles, Ill. or a similar system is available from Branson Sonic Power Company located in Danbury, Conn. Typically, a generator, such as a Dukane 1800 watt, 20 kHz generator (Part No. 20A1800), is connected to a driver assembly, such as a Dukane driver assembly (Part No. 110-3123), to provide the necessary ultrasonic excitation. Any combination of boosters, such as a Dukane 1:1 booster (Part No. 2177T) and a Dukane 2:1 booster (Part No. 2181T), may then be attached to the driver assembly. Finally, the rotary ultrasonic horn is attached to the boosters. Thus, the combination of the generator, drive assembly and boosters ultrasonically excites the rotary ultrasonic horn thereby providing the ultrasonic energy necessary to effect the desired manipulation of the substrate web 54 passing between the rotary horn 50 and the anvil roll 20 of the present invention.

The projections 24 on the anvil roll 20 can be arranged in any suitable predetermined pattern to provide the desired operation on the substrate web 54. As representatively illustrated in FIG. 1, the projections 24 may extend completely across the anvil roll 20 or, in the alternative, may be disposed on only a portion of the anvil roll 20. The anvil lands 28 of the projections 24 on the anvil roll 20 press the substrate web 54 or webs against the second roll 50 to effect the desired operation on the substrate web 54 or webs at specific locations. For example, as representatively illustrated in FIG. 1, the projections 24 on the anvil roll 20 can be configured to bond two continuously moving substrate webs together at bond locations which are arranged in a predetermined bond pattern.

The projections 24 may be of any shape or size depending upon the desired configuration of the bonding, cutting, perforating, embossing or other operation. In the illustrated embodiment, the projections 24 are continuous bands or bars across the width of the anvil roll 20. The bands may extend substantially parallel to the rotational axis 22 of the anvil roll 20, or may be offset at a selected angle relative to the rotational axis. Other configurations and patterns of the projections 24 may optionally be employed, as desired. For example, the projections 24 could be a series of points, dots, squares, rectangles and the like or combinations thereof.

The patterned anvil roll 20 of the present invention provides particularly improved results when the machine directional width of the outer land surface 28 of the projections 24 is relatively small. As used herein, the term "machine directional width" refers to the width of the surface 28 in the direction 56 in which the substrate web 54 is moving along the anvil roll 20 as indicated in FIG. 1. For example, the anvil roll 20 is particularly effective in maintaining improved release of the substrate web from the projections 24 when the machine directional width of the outer land surface 28 of the projections 24 is from about 0.025 to about 0.25 centimeters and desirably from about 0.050 to about 0.15 centimeters. Moreover, in a particular embodiment as representatively illustrated in FIG. 3, the base 26 of the projections 24 defines an area which is greater than the area of the land surface 28 of the projections 24 to provide a sloped surface for improved release of the substrate web 54 or any undesired materials from the projections 24.

As representatively illustrated in FIGS. 2 and 3, the anvil roll 20 of the present invention further includes a plurality of recesses 32 which are located between the bases 26 of the projections 24. The inner surface of the recesses 32 define an inner anvil radius 34 while the outer peripheral land surface 28 of the projections define an outer anvil radius 30.

The anvil roll 20 also includes a resilient release material 36 such as, for example, silicone rubber, in the recesses 32 between the bases 26 of the projections 24. The release material 36 occupies a majority of the area in the recesses 32 to improve the release of the continuously moving web 54 and reduced buildup of material in the recesses 32 without adversely affecting the desired operation on the web 54 or webs. For example, when effecting an operation on a continuously moving web which has adhesive applied thereto, the adhesive material on the substrate web 54 does not readily adhere to the release material 36 between the projections 24 for improved processing. Moreover, if the web 54 is being melted in any manner such as by thermal or ultrasonics, the release material 36 reduces the amount of buildup of melted web material and adhesive in the recesses 32.

By reducing the buildup of undesired materials in the recesses 32 between the projections 24 on the anvil roll 20, the amount of buildup on the second roll 50 is also reduced thereby improving the process. This reduction in buildup on the second roll 50 leads to particularly improved results when the second roll 50 is a rotary ultrasonic horn as excessive buildup on the rotary horn can affect it's bonding capability. Suitable release materials which can be included in the recesses 32 between the projections 24 on the anvil roll 20 include silicone rubber, electroless nickel, polytetrafluoroethylene, chrome, polyurethane, polyolefins or the like, as well as combinations thereof. In a particular embodiment, the release material 36 is selected from the group consisting of rubber and rubber containing compounds. Desirably, the release material 36 defines a durometer of from about 50 to about 90 and more desirably from about 60 to about 80 to provide the improved release without adversely affecting the desired operation on the substrate web.

The release material 36 can be incorporated into the recesses 32 between the projections 24 on the anvil roll 20 in any suitable manner which are known to those skilled in the art. For example, in a particular aspect, silicone rubber is incorporated onto the anvil roll 20 by the following process. A suitable amount of non-cured silicone rubber is placed into the recessed areas 32. A layer of flexible material such as cured silicone rubber is then placed over the non-cured silicone rubber and clamped thereto. Pressure may be applied to the layer of material to compress the non-cured silicone rubber below the outer land surface 28 of the projections 24 on the anvil roll 24. After the silicone rubber in the recesses is cured, the clamped layer is removed. To ensure adequate adhesion of the release material 36 to the recesses 32 between the projections 24, a bonding agent may be applied to the outer surface of the anvil roll 20 prior to placing the non-cured silicone rubber into the recesses 32. Suitable bonding agents are well known to those skilled in the art.

The release material 36 is included in the recesses in a sufficient amount to reduce the build up of undesired materials and improve the release of the substrate web. For example, in a particular embodiment as illustrated in FIG. 3, the outer surface of the release material 36 should be positioned a distance 38 of from about 0.25 to about 1.50 millimeters and desirably from about 0.50 to about 1.00 millimeters radially inward from the outer peripheral land surfaces 28 of the projections 24 for improved performance. Accordingly, the outer most surfaces of the release material are recessed inward from the outer most surface of the projections 24.

The anvil roll 20 of the present invention as representatively illustrated in FIGS. 1–3, may also include a pressuring means (not shown) connected to the anvil roll 20 or second roll 50 for exerting resilient force on the substrate webs 54. The pressuring means should be capable of exerting a force of from about 1 to about 300 and desirably from about 10 to about 150 pounds per lineal inch (from about 0.1 to about 55 and desirably from about 2 to about 27 kilograms per lineal centimeter). Any mechanism capable of exerting the desired amount of force on the webs is suitable such as, for example, an air pressure mechanism.

In use as illustrated in FIGS. 1–3, the substrate web 54 is supplied in the direction indicated by the arrow 56 associated therewith along a substrate path into a nip between the anvil roll 20 and the second roll 50. The anvil roll 20 includes a plurality of projections 24 arranged in a predetermined pattern with recesses 32 therebetween. The anvil roll includes a resilient release material 36 located in the recesses 32. One of the anvil roll 20 and the second roll 50 is rotated thereby pulling the substrate web 54 through the nip and pressing the substrate web between the outer peripheral land surface 28 of the projections 24 on the anvil roll 20 and the second roll 50 to effect the desired operation on the substrate web.

The different aspects of the invention can more efficiently provide an apparatus and method for effecting an operation on at least one continuously moving substrate web. The different aspects of the present invention provide improved release of the substrate web from the pattern of projections on the anvil roll which results in improved manufacturing efficiency and quality of the substrate web when compared to conventional apparatus and methods.

In particular, the improved anvil roll of the present invention can result in a decrease in the undesirable buildup of materials between the projections of at least about 50 and more desirably at least about 100 percent when compared to conventional anvil rolls. The amount of the reduction can depend upon the particular webs being processed and the variability in the coatings or adhesive on the webs.

As set forth above, the different aspects of the present invention may be used in the manufacture of an absorbent article, such as a disposable diaper. Such absorbent articles typically include a bodyside liner, an outer cover, an absorbent core located between the bodyside liner and the outer cover, a pair of elasticized, longitudinally extending leg cuffs, a pair of waist elastics and a fastening means to hold the absorbent article about the waist of the wearer when in use.

In a particular aspect, the leg cuffs are manufactured and attached to the bodyside liner of the absorbent article using the anvil roll 20 of the present invention and a rotary ultrasonic horn. Such leg cuffs typically include a plurality of elastics strands, such as, for example, Lycra® elastomeric strands available from DuPont, a business having offices in Wilmington, Del. By using a rotary ultrasonic horn and the anvil roll 20 of the present invention to create and attach the leg cuff, a more consistent and higher quality leg cuff and article is obtained. The anvil roll 20 of the different aspects of the present invention may also be used to attach other components to the absorbent article.

A wide variety of diaper configurations, as well as training pants, incontinence garments, and like configurations, can be manufactured using the different aspects of the method and apparatus of the present invention. Examples of diaper configurations suitable for use in connection with the instant application and other diaper components suitable for use on diapers are described in U.S. Pat. No. 4,798,603 issued Jan. 17, 1989, to Meyer et al.; U.S. Pat. No. 5,176,668 issued Jan. 5, 1993, to Bernardin; U.S. Pat. No. 5,176,672 issued Jan. 5, 1993, to Bruemmer et al.; U.S. Pat. No. 5,192,606 issued Mar. 9, 1993, to Proxmire et al., and U.S. Pat. No. 5,509,915 issued Apr. 23, 1996, to Hanson et al., the disclosures of which are herein incorporated by reference to the extent they are consistent herewith.

While the invention has been described in detail with respect to specific aspects thereof, it will be appreciated that those skilled in the art, upon attaining an understanding of the foregoing, may readily conceive of alterations to, variations of, and equivalents to these aspects. Accordingly, the scope of the present invention should be assessed as that of the appended claims and any equivalents thereto.

What is claimed is:

1. A method for effecting an operation on at least one continuously moving substrate web comprising the steps of:
    a) supplying said at least one continuously moving substrate web along a substrate path;
    b) providing a first roll adjacent said substrate path which includes a plurality of projections arranged in a predetermined pattern with recesses therebetween wherein each of said projections define a base and an outer peripheral land surface upon which said substrate web travels and wherein said first roll includes a resilient release material located in said recesses between said projections to at least partially fill said recesses;
    c) providing a second roll adjacent said substrate path wherein said second roll defines an outer peripheral surface which is configured to press said substrate web against said outer peripheral land surface of said projections on said first roll; and
    d) rotating one of said first roll and said second roll thereby pressing said substrate web against said outer peripheral land surface of said projections on said first roll to effect said operation on said substrate web.

2. The method of claim 1 wherein the step of supplying said substrate web includes the step of supplying a nonwoven material.

3. The method of claim 1 wherein the step of supplying said substrate web includes the step of supplying an elastomeric material.

4. The method of claim 1 wherein said step of providing said second roll comprises the step of providing an ultrasonic bonding means which includes a rotary ultrasonic horn.

5. The method of claim 1 wherein said step of rotating one of said first roll and said second roll embosses said substrate web along said predetermined patter.

6. The method of claim 1 wherein said step of rotating one of said first roll and said second roll cuts said substrate web along said predetermined pattern.

7. The method of claim 1 wherein said step of rotating one of said first roll and said second roll intermittently perforates said substrate web along said predetermined pattern.

8. The method of claim 1 wherein said step of rotating one of said first roll and said second roll bonds said substrate web to a second continuously moving substrate web along said predetermined pattern.

9. The method of claim 4 wherein said step of rotating one of said first roll and said rotary ultrasonic horn bonds said substrate web to a second continuously moving substrate web along said predetermined pattern.

10. The method of claim 1 wherein the step of supplying said substrate web includes the step of supplying an adhesive on said substrate web.

11. An apparatus for effecting an operation on a continuously moving substrate web comprising:
    a) a first roll which is configured to rotate about a first axis and which includes a plurality of projections arranged in a predetermined pattern with recesses therebetween wherein each of said projections define a base and an outer peripheral land surface upon which said substrate web is configured to travel;
    b) a second roll which is configured to rotate about a second axis and which defines an outer peripheral surface which is configured to press said substrate web against said outer peripheral land surface of said projections on said first roll thereby effecting said operation on said substrate web; and
    c) a resilient release material located in said recesses between said projections on said first roll wherein said release material at least partially fills said recesses.

12. The apparatus of claim 11 wherein said second roll includes a rotary ultrasonic horn.

13. The apparatus of claim 11 wherein one of said first and said second rolls is heated to effect said operation on said substrate web.

14. The apparatus of claim 12 wherein said first and said second roll are configured to ultrasonically bond said substrate web to a second substrate web along said predetermined pattern.

15. The apparatus of claim 11 wherein said release material is selected from the group consisting of rubber and rubber containing compounds.

16. The apparatus of claim 11 wherein said release material is silicone rubber.

17. The apparatus of claim 11 wherein said release material defines a durometer of from about 50 to about 90.

18. The apparatus of claim 11 wherein a distance between an outer peripheral surface of said release material and said outer peripheral land surface of said projections is from about 0.25 to about 1.50 millimeters.

19. The apparatus of claim 11 wherein said outer peripheral land surface of at least one of said projections defines a machine directional width of from about 0.025 to about 0.25 centimeters.

20. The apparatus of claim 11 wherein said base of said projections defines an area which is greater than a surface area of said outer peripheral land surface.

21. An apparatus for ultrasonically bonding at least two continuously moving substrate webs together comprising:
    a) a patterned anvil roll which is configured to rotate about a first axis and which includes a plurality of projections arranged in a predetermined pattern with recesses therebetween wherein each of said projections define a base and an outer peripheral land surface upon which said substrate webs are configured to travel;
    b) an ultrasonic bonding means for providing ultrasonic energy wherein said ultrasonic bonding means includes a rotary ultrasonic horn which is configured to rotate about a bonding axis and which has an outer peripheral bonding surface which is configured to press said substrate webs against said outer peripheral land surface of said projections on said patterned anvil roll thereby ultrasonically bonding said substrate webs together at bond points arranged in said predetermined pattern; and
    c) a resilient release material located in said recesses between said projections on said patterned anvil roll wherein said release material at least partially fills said recesses.

22. The apparatus of claim 21 wherein said release material is selected from the group consisting of rubber and rubber containing compounds.

23. The apparatus of claim 21 wherein said release material is silicone rubber.

24. The apparatus of claim 21 wherein said release material defines a durometer of from about 50 to about 90.

25. The apparatus of claim 21 wherein an outer peripheral surface of said release material is recessed from said outer peripheral land surface of said projections a distance of from about 0.25 to about 1.50 millimeters.

26. The apparatus of claim 21 wherein said outer peripheral land surface of at least one of said projections defines a machine directional width of from about 0.025 to about 0.25 centimeters.

* * * * *